(No Model.)
I. T. DYER.
APPARATUS FOR ELEVATING WATER.
No. 409,279. Patented Aug. 20, 1889.
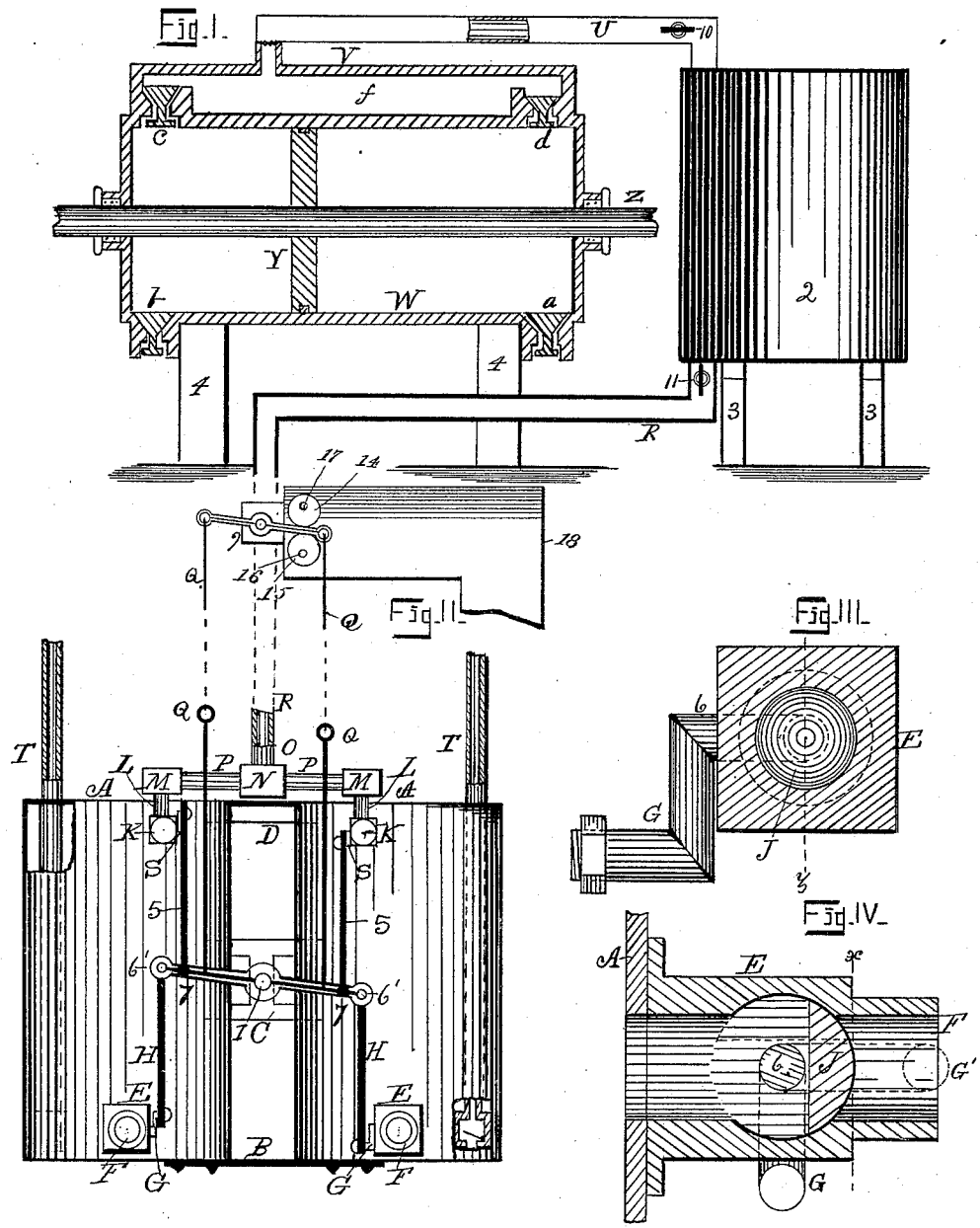
Witnesses
R. W. Shepard
F. H. Moore.
Inventor.
Isaac T. Dyer.
By G. L. Chapin
Atty

UNITED STATES PATENT OFFICE.

ISAAC T. DYER, OF CHICAGO, ILLINOIS, ASSIGNOR TO HIMSELF AND PETER FISH, OF SAME PLACE.

APPARATUS FOR ELEVATING WATER.

SPECIFICATION forming part of Letters Patent No. 409,279, dated August 20, 1889.

Application filed June 6, 1888. Serial No. 276,290. (No model.)

*To all whom it may concern:*

Be it known that I, ISAAC T. DYER, a citizen of the United States, and a resident of Chicago, county of Cook, and State of Illinois, have invented a new and useful Apparatus for Elevating Water, of which the following is a specification, reference being had to the accompanying drawings, illustrating the invention, in which—

Figure I is a longitudinal vertical section of a double-action air-pump and an elevation of an air-receiver connected by pipes; Fig. II, an elevation of two water-cylinders with water-valves, air-valves, water-discharge pipes, air-pipes, and walking-beam and connecting-rods for operating the valves; Fig. III, a transverse section of one of the water-valves on line $x$, Fig. IV; Fig. IV, a longitudinal vertical section of one water-valve on line $z$, Fig. III.

This invention relates to novel means for elevating water from mines, in buildings, and other places by air-pressure.

The nature of the invention will be fully comprehended by the following description, as defined by the claim.

A A represent two iron cylinders, which are constructed to withstand any required pressure, and of such size as may be required to raise a given quantity of water. That the cylinders may be held in position to operate with the connecting mechanism, they are held together at the bottom and top by iron bars B D and at their central portions by a strong bracket C. Quite near the bottom of each cylinder A is properly secured a valve-case E, terminating in a pipe F, and in the case is placed a quarter-spherical valve J, which is rigidly secured to a shaft 6, having bearings in the sides of the case, and one end of the shaft terminates in a crank G, by means of which, and the proper movement of a connecting-rod H, the valve may be turned to close the pipe F, or turned, as shown by dotted lines G', to form a passage for water to enter the cylinder A. A walking-beam I is pivoted to the bracket C, and to its ends, at 6' 6', are jointed the rods H, which are hinged to the cranks G. K K, near the upper portions of the cylinders, are cases, like the cases E, above described, and in them, respectively, is placed a three-way valve, of ordinary well-known construction, so that the valve lets air into one cylinder while air is excluded from the other cylinder by means of the other valve, and that after the water is forced out of the cylinder the reverse motion of the valve, turned by the crank S, will permit the air to escape and still shut off the air-supply and keep it shut off till the water in the other cylinder is expelled, after which the valves are in position for again letting air into the first cylinder. These three-way valves being kept in stock, no illustration is required.

The pipes L L, Fig. II, serve the same purpose as the pipe F, only they take air instead of water. Rods 5 connect the cranks S and the walking-beam I at 7 7 inside of connections 6'. Valve-cases K communicate with the cylinders A A, and pipes L communicate with cases K and heads M, and pipes P communicate with heads M N, and to head N is affixed a pipe R. Because the pipes F are horizontal and the pipes L are vertical the valves in cases E will be closed when the valves in cases K are open, and vice versa. Rods or chains Q Q connect with the walking-beam I and with a walking-beam 9 above the tops of the cylinders.

The cranks S S are driven by connecting-rods 5 5 and the cranks G by rods H and walking-beam I, and the walking-beam I is driven by rods or chains Q Q and a walking-beam 9. This beam is driven by power applied to two eccentric rollers 14 and 15, Fig. II, one of which is placed above and the other below one end of said beam. The shafts 16 and 17 of the rollers are driven at the same speed, and the rollers, being of equal diameters and having the required throw, cause the cranks G S to make, respectively, one revolution to every complete oscillation of the beam.

W represents a double-acting air-pump. Y is the piston, and Z is the piston-rod, to be driven by any suitable power. The valves are shown at $a$ $b$ $c$ $d$, and the connecting air-chamber for the upper valves is shown at $f$. A pipe U connects this chamber with the air-receiver 2, and a pipe R, connecting with the receiver, is to extend and connect with the pipe R, Fig. II, the piston Y supposed to be moving to the left, the valve $a$ taking air, and the valve $c$ discharging air. The air in the chamber alternately holds the valves $d$ $c$ closed.

To put the apparatus in operation, sink the cylinders A to the bottom of the mine. At the same time bring the water-discharge pipes T to the surface or place of discharge by suitable extensions, and also make connections by chains or rods with the walking-beams I 9; also connect pipes R R. Then bring the walking-beams I 9 to the positions shown to open the valve in the left-hand case E, and close the valve in the right-hand case; and close the valve in the left-hand case K and open the valve in the right-hand case K. Now put the requisite pressure of air in pipe R and it will reach the top of the water in the right-hand cylinder A and force the same up through the right-hand pipe T, the said pipe extending down to near the bottom of the cylinder for that purpose. Reverse the position of the walking-beams and the water in the other cylinder will be emptied, while the first cylinder discharged will be filled. 10 and 11 represent check-cocks for regulating the movement of air, and 3 and 4 show the supports for the air-receiver and pump.

This apparatus is a simple and efficient means for raising water, and it has the advantage in cold weather of having nothing to freeze, while water-pumps in many mining districts will freeze fast so soon as they are brought to a stand.

Another advantage is, the air-pump, when not employed to raise water, can be employed to supply the mine with air.

I claim as new and desire to secure by Letters Patent—

An apparatus for elevating water, consisting of the cylinders A, provided with water-exit pipes T T, extending down to near the bottom of said cylinders and inside thereof, the water-induction pipes F, which are provided with crank-valves G 6 J, and the air-valves S K, communicating with the cylinders, in combination with the walking-beams I and 9, having suitable connecting-rods, the air-receiver 2, and a branch pipe R M N, leading therefrom to and communicating with the air-valves S K, and an air-pump having its exit-pipe communicating with the air-receiver 2, and mechanism for driving the upper walking-beam, substantially as specified and shown.

ISAAC T. DYER.

Witnesses:
G. L. CHAPIN,
C. M. CLANCEY.